United States Patent
Baker et al.

(10) Patent No.: US 11,954,460 B1
(45) Date of Patent: Apr. 9, 2024

(54) METHOD AND SYSTEM FOR HOMOICONIC LOW-CODE/NO-CODE APPLICATION DEVELOPMENT

(71) Applicants: Robert G Baker, Boynton Beach, FL (US); Jordan Henderson, New Galilee, PA (US); Michael Cairl, Brooklyn, NY (US)

(72) Inventors: Robert G Baker, Boynton Beach, FL (US); Jordan Henderson, New Galilee, PA (US); Michael Cairl, Brooklyn, NY (US)

( * ) Notice: Subject to any disclaimer, the term of this patent is extended or adjusted under 35 U.S.C. 154(b) by 0 days.

(21) Appl. No.: 18/452,542

(22) Filed: Aug. 20, 2023

(51) Int. Cl.
*G06F 8/34* (2018.01)
*G06F 8/33* (2018.01)

(52) U.S. Cl.
CPC . *G06F 8/34* (2013.01); *G06F 8/33* (2013.01)

(58) Field of Classification Search
CPC ..................................... G06F 8/33; G06F 8/34
See application file for complete search history.

(56) References Cited

U.S. PATENT DOCUMENTS

| | | | | |
|---|---|---|---|---|
| 2007/0261027 | A1* | 11/2007 | Dhanakshirur | G06F 8/34 717/109 |
| 2011/0289439 | A1* | 11/2011 | Jugel | G06F 8/34 715/771 |
| 2017/0131974 | A1* | 5/2017 | Balasubramanian | G06F 9/5072 |
| 2020/0356350 | A1* | 11/2020 | Penland | G06F 8/34 |
| 2021/0255842 | A1* | 8/2021 | Levitt | G06F 8/34 |
| 2022/0236965 | A1* | 7/2022 | Rahill-Marier | G06F 9/451 |
| 2022/0413843 | A1* | 12/2022 | Agarwal | G06F 8/34 |
| 2023/0119466 | A1* | 4/2023 | Sjölander | G06F 8/42 717/143 |

OTHER PUBLICATIONS

Antonio Leitao, "From Lisp S-expressions to Java source code," 2008 [retrieved on Feb. 15, 2024], Computer Science and Information Systems 2008 vol. 5, Issue 2, pp. 19-38, downloaded from <url>:https://doi.org/10.2298/CSIS0802019L. (Year: 2008).*

* cited by examiner

*Primary Examiner* — S. Sough
*Assistant Examiner* — Stephen D Berman

(57) ABSTRACT

A method and system for developing low-code and no-code software applications in a visual programming environment uses data flow expressions in which processing steps are represented as homoiconic data expression statements recorded in a transaction log that is accessible to developers at all times and that follows ACID rules. Data flow expressions are written in an interface description language for easy readability by non-programmers. An internal replacement language represents the modeled application and produces executable code by applying a target language template, producing executable code in other programming languages without knowing how to code in those languages.

18 Claims, 8 Drawing Sheets

METHOD AND SYSTEM FOR HOMOICONIC LOW-CODE/NO-CODE APPLICATION DEVELOPMENT

FIELD OF THE INVENTION

The present invention relates to the field of graphical or visual programming of source code and software applications using low-code and no-code (LCNC) development techniques.

BACKGROUND OF THE INVENTION

Computer programming has been an important occupation in the modern world since the introduction of computer hardware on a widespread basis. Courses in computer science include discussions on algorithm development, flowcharts, data integrity and security, networking, mobile and web applications, data structures and databases. Various new and traditional programming languages with their respective advantages and shortcomings are also taught. Practitioners in this field ordinarily study an assortment of programming languages to learn different techniques to use with the preferred language of their current employer or customers.

Conventional computer languages have strengths and weaknesses, but also have much in common. Each application development language has a set of grammar rules and syntax forms that define how commands in the language are written and interpreted. Just as translated commands are used to drive high-precision electronic hardware, the generated outputs from programming platforms must be built using precise language to be correctly handled by computer software and circuits. There are differences in data types that define what kind of data can be used in a program in various circumstances, so data must be properly identified to be managed accurately. Each language has its own control structures and methods that define how programs flow and make decisions based on received data or other inputs. Programming languages manage storage and retrieval actions in associated devices to potentially re-use code and save design costs on new applications or extensions of existing applications.

In today's data-driven society, there are business pressures to accomplish programming tasks faster and with fewer errors to compete successfully in the marketplace. From an overall business management perspective, the process often starts with marketing departments defining what they believe customers want. Technical managers then establish an approach to satisfy the need and select the appropriate hardware and software tools for generating the needed products or services. The choice of toolsets is complicated when managers are attracted to claims for new tools in hopes of relieving some of these business pressures. Personnel departments then must find enough programmers with the correct skills to handle the specific assignments. With increased development costs for software tools and higher pay rates for the sought-after programmers with the most current skills, there is an increasing cost for products and services offered to end customers. Higher development costs often reduce competitiveness against other providers in the market.

On an individual level, there are ongoing issues for programmers developing goods and services in the modern world. The diversity of hardware platforms, device types and operating systems (e.g. Android vs. IOS; Windows vs. Apple vs. Linux) is magnified by the evolution of hardware to ever larger byte widths and new standards. Although new programming languages periodically become available, it takes some time and focus to gain expertise in new languages. Programmers therefore tend to continue programming in languages they already know. In this high-pressure demand-driven development world, there is often insufficient time to explore new programming tools and become fully proficient in them. Data security challenges and international threats of ransomware also absorb an increasing percentage of a developer's creative bandwidth. An additional business requirement is often backward compatibility from current to previous versions of applications.

To attempt to alleviate some of the problems, a few companies created no-code (NC) and low-code (LC) software programming platforms to reduce complexity and development time. No-code solutions are generally defined as limited to the supplied functions that are included with the NC software tool. This keeps the developed code simple because it generally does not allow the incorporation of custom program elements or command statements in a language requiring specific training. In contrast, low-code solutions are often defined as providing more freedom to expand and incorporate custom code where desired. The addition of custom code requires broader knowledge by a programmer unless the custom code is written by others and treated as a black box unknown. Even with experience in the language of the added custom code, many programmers find it necessary to continue adjusting and updating their custom code subsections. This diminishes the expected value of the LC application software platform. For novice or untrained programmers, custom code may necessitate additional training to maintain all aspects of their application on an ongoing basis. It is commonplace that as one starts adding self-written code, the complexity and maintainability of the solution increases dramatically.

The method and system of the present innovation are characterized as LCNC (both low-code and no-code) in that they are fully operational and capable as an NC solution while also allowing a programmer to call or write custom data expressions for components in their solution. Hereinafter, the term "modeler" is used to signify a person designing and developing a program using the graphical tools of the present innovation, since no specific programming skills are required. Any person that can analyze some design objective or a problem being addressed and can organize an approach to solve it can "model" a solution that is translated into executable code.

Collectively, there are various limitations of currently available LC and NC tools or platforms. Many LC and NC output codes are restricted to individual targeted hardware devices or software (for example, either iOS or Android phone operating systems but not both). Other limitations include types of databases or specific brands of browsers. The languages required by the business needs of a representative enterprise may not be available as executable output code from a given software development tool. A further shortcoming is that most development tools are used by individuals since creative tasks are usually performed independently. Even in Agile software development, guidance and problem-solving occur in a group, but individuals carry out their assigned tasks by themselves. There is often a limit of one developer at a time being allowed to engage an instance of a tool, so cooperative efforts are disjointed and asynchronous.

Most software tools require specifying the target execution location of each of the computing processes in a client-server setting. This is conventionally organized at the time of writing the application. This manual balancing of processes among hardware devices is tedious and subject to introduction of errors. The complexity inherent in some of the limitations above also makes it difficult to understand a program's internal representation through a reading of the program code. A simplified model for a programming language is one in which the language treats the code as if it were data. Such a feature allows easier inspection and repair of a program's sequence of instructions. As an extra difficulty, most LCNC application development tools do not adhere to Atomic, Consistent, Isolated, Durable (ACID) techniques, thereby risking the validity or integrity of data involved in various processes.

Therefore a need for a simplified application programming method and system exists that is readily usable by individuals or groups with differing levels of programming skills. For those with little or no programming skills, a simplified method and system allows solution development without years of specific training and practice. For those with high levels of programming skills, the ideal platform facilitates improvements in productivity and maintainability. For businesses, such a tool provides significant flexibility in the freedom to hire both untrained and highly trained programmers, as well as those with intermediate skills. The preferred development method and associated system would readily produce output code operable on all currently known devices and software environments. Programmers would also be able to engage separately written custom code for specific needs. The development method and system of the present innovation assigns computing processes to assorted devices as either a manual option of the modeler or automatically based on predefined parameters. This method and system have the potential for dramatic cost savings for companies and widespread use even among non-programmers.

There is also an unfulfilled need for a programming method and system that is capable of producing executable code in a large number of languages. To reach a high level of expertise, most programmers concentrate on developing skills in just a few programming languages. This specialization limits the types of projects in which a programmer may participate, as well as hindering the programmer's job mobility. The ideal application development platform would be capable of outputting executable program code in numerous languages without the requirement for the author's expertise in that language. Such an ideal system is useful for complete applications and code segments or modules that can be produced rapidly with no need for syntactic debugging.

The method and system of the present innovation described herein meet these needs in the product development and business worlds, as the accompanying explanations and illustrations demonstrate.

The term "present innovation" is used in most discussions below interchangeably with or in place of "present application" to distinguish between this application for a patent and a computer application (i.e. program). The terms "a" or "an", as used herein, are defined as one. The term plurality, as used herein, is defined as two or more than two. The term "another," as used herein, is defined as at least a second or more. The terms "including" and "having," as used herein, are defined as comprising (i.e., open language). The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

BRIEF SUMMARY

The present innovation describes both a method and a system for developing low-code and no-code software applications and short functional segments of application code in a visual programming environment. This programming environment uses homoiconic data flow expressions in which model processing steps corresponding to steps in an application program are represented as homoiconic data expression statements. The collection of changes made in data expression statements constitutes a transaction log upon completion of each successive successful execution. The data expression statements and transaction log are accessible to developers at all times and follow ACID rules. In short, the "A" in ACID stands for "atomic," meaning that all changes associated with a given process step occur, or none of the changes occur. This all-or-none characteristic ensures that a transaction is never partially completed, so a program step always produces a complete result when it successfully finishes the step. Performing an incomplete set of processes could affect data integrity between different sections of a program, variables or data store locations in a system.

"C" stands for "consistent," and it is a preferred property of databases, logs and processes that requires that any change maintains the integrity of the data. All instances of a data element in any location in a given system's data hold the same value after an atomic process has completed. Values of each data element are thus consistent throughout a system. "I" translates to "isolated," and it refers to the independence of each transaction from all other transactions. In an isolated system, two or more processes cannot interfere with each other. An isolated process step or data transaction protects its associated data from corruption that might be caused by multiple processes interacting with the data at the same time. The "D" in ACID means "durable," and it indicates that once a completed process has been documented in a transaction log, it remains in the log even if there is a system failure. In that way, programmers can trust that transactions that have used or appropriately modified data are preserved.

In ACID protocols, each processing step is indivisible and either completes successfully or data values return to an immediately prior state in the transaction log. Each processing step consists of one or more sub-steps. Furthermore, any change to data from data flow expression processing maintains data integrity. Another characteristic of ACID protocols is that each processing step is discrete and independent of every other processing step. In an ACID-adherent process, there is no possibility of data interference from separate processing steps simultaneously acting on one instance of data. Yet another characteristic of ACID properties is that successfully completed processing steps are permanently recorded in a transaction log such that constituent data is not affected by other potential failures of a system. Further still, transaction logs are accessible to at least one modeler in real time while the modeler develops the application. Another ACID property is that more than one modeler is allowed to simultaneously interact with elements used to create the software model and the associated transaction log for the software model using the visual programming environment, and this is accomplished without interfering with other modelers or corrupting data.

Among other methods, visual programming environments employ traditional icon movement techniques such as dragand-drop. Moving icons visually on a two-dimensional (2D) display screen or in a three-dimensional (3D) visual space is accomplished through any input/output (I/O) means including but not limited to a mouse, touch pad, pointer stick, gloves, tablets, gesture recognition, and eye tracking. With no requirement for knowing formal programming tools or syntax, the method of this innovation is usable by non-programmers and those with limited programming expertise such as business analysts, project leaders and managers, in addition to experienced programmers. Modelers creating or modifying programs manipulate icons representing components of the present innovation onto a visual workspace. The modelers then establish connections between components to direct one or more flows of data to accomplish desired purposes. Programs written using this method or a system with this application development tool do not exist and operate as traditional lines of code but as sequences of data expressions. Such programs are homoiconic by virtue of their constituent program sequence steps being capable of manipulation as data. Thus the program's internal representation and purpose can be inferred by reading the program data expressions. The data expressions are written with an internal expression language and grammar associated with various components, and this grammar is easily read without extensive formal programming training or coursework.

One advantage of this approach is that it allows modelers to change a constituent data expression while an implementation is running. The application development method and system of the present innovation can then generate an executable code package for external use and install it without stopping the operation of the program. This facilitates realtime evaluation of a model's performance. The desired target code generated in the modeler's programming language of choice, for example C++, JavaScript, Visual Basic, is continually produced by the method and system consistent with the defined model.

Overall data reliability is enhanced in a computer-based method or system through adoption of ACID principles as they apply to data processing. These principles are often used for improving fault tolerance in systems or techniques involving multiple or distributed processors. The transaction log of the present innovation is central to the operation of the method and system. The durability of an ACID process is also known as persistence, with a modeler benefit that it can be inspected before and after processing steps. The transaction log can be viewed even after the processing platform has been turned off and then turned back on. Executed transactions according to the method or system of the present innovation can be rolled back and changes reversed if needed without having to reconstruct, re-assemble or re-initiate an entire program sequence.

An advantage of the method and system of the present innovation is the development of an internal language version of a modeler's program that serves as a universal source code for the creation of output programs in other languages of choice. Since the source program is derived from a graphical model that is built using formats and rules of the internal language, templates for other languages that are applied to the model readily translate the source data expressions into lines of output code. By this technique, modelers do not need to have programming expertise in their selected output target code. The method or system generates clean and fully operational code that is syntactically and semantically accurate.

The method of the current innovation and systems built thereon support the interaction of a plurality of modelers accessing the same instance of the platform from separate devices while developing a single program. This capability allows various modelers to each focus on a portion of the total creative programming effort within a given application at the same time for more rapid development of a complete solution. This is done without corrupting interference between modelers. An internal transfer hub manages exchanges between multiple modelers and prevents them from changing the same component or data expression at the same time. More than one modeler can work in the same workspace at one time, but modelers are not able to change the same element at one time.

Another advantage of the method and system of the present innovation is the capability to assign the location of processing tasks for a created program among the constituent connected device processors in each deployed environment. Modelers can either assign the processing actions manually or have the program platform balance processing actions based on a preference for emphasis on one or more connected device and subsystem attributes. Examples of attributes that can be factored into a decision include real-time performance capability, overall speed of execution, availability of network and bus connection resources, available output devices like display screens and audio output modalities, memory availability on the assorted platforms of execution, power availability on the assorted platforms of execution, and data concentration points.

These and other advantages become apparent in a thorough reading of the detailed description in concert with illustrative drawings. Descriptions included herein are meant to provide non-limiting examples by way of explanation, and other configurations or similar components are capable of satisfying the nature and intent of this innovation.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

In the following detailed description, specific examples are described with reference to the accompanying drawings that form a part of this document. These examples describe the system and method in sufficient detail to enable those skilled in the associated arts to practice the invention. These are examples only and should not be taken as limiting. Other examples may also be practiced that are consistent with the spirit and intention of the present system and method and apparent to those skilled in the associated arts, and the scope is defined by the appended claims and their equivalents.

Figure 1:
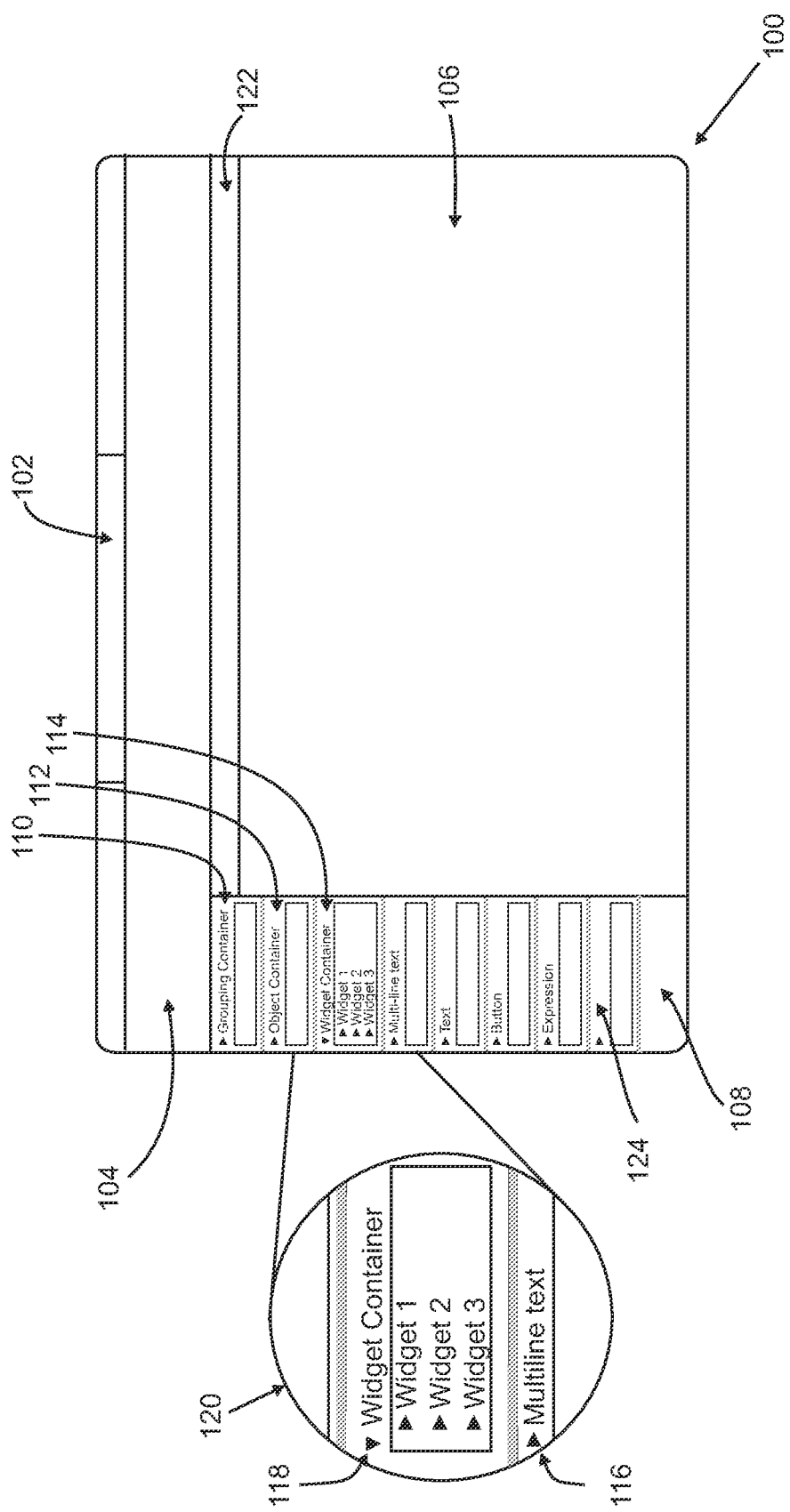
FIG. 1 is an illustration of one embodiment of a screen layout for a modeling workspace of a representative visual programming environment according to principles of the present innovation.

FIG. 1 illustrates one embodiment of a screen layout 100 for a modeling workspace of a representative visual programming environment according to the principles of the present application. There are various optional sections of the workspace that are available to be included on screen at one time at the modeler's discretion. The positions of the sections are also placed alternatively in other locations than shown in FIG. 1 in other embodiments of the present application. The included list and identification of sections is solely illustrative and is not all-inclusive, and many other embodiments and sections are optionally suitable for inclusion. In this embodiment, a section 102 near the top of the workspace is optionally employed for identifying a product name and other useful commercial information. This section and other sections are alternatively included at various dimensions and modified as preferred by the modeler. Section 104 displays various types of optional information, examples of which are the name assigned to the program by the modeler, buttons to direct concluding actions such as "Save", "Close" or "Regenerate code", indicators for mode of operation, and mode-specific and other information that is potentially of interest to a system modeler or end user. These items are positioned in various ways based on mode of operation, and the position and types of items are not limited to those hereby identified. Section 106 is the workspace assembly area, and this is a space in which objects representing transforms, input means, expressions and other elements are dragged or otherwise placed from section 108 and variously connected to satisfy the purposes of the modeler in a particular solution development effort.

In this embodiment, subsections 110, 112 and 114 of column 108 are examples representing hierarchical collections of components, input means, and expressions that are alternatively expanded to show more elements of a similar variety. Inset drawing 120 provides an expanded view of a portion of column 108. In this example of one embodiment, subsection 110 is identified as the organizing area for "Groupings" of various elements, and it is thus called the "Grouping Container." A triangular expansion icon 116 that points to the right (an example of which is shown associated with the Multiline text subsection in inset drawing 120) indicates that there are additional elements of this type available upon expansion. No further expansion of Groupings is shown in this example. For illustration, triangular icon 118 (an example of which is shown associated with the "Widget Container" subsection 114 in inset drawing 120) is oriented pointing down, indicating the lower levels of the hierarchy of widgets currently being shown in the Widget Container subsection 114. To indicate that expansion of a named widget is available to the modeler, a corresponding expansion icon is shown to the left of each such widget.

Thus, in this embodiment, Widgets 1, 2 and 3 are each shown with an expandable icon in the 116 style, so there is at least one additional level of selection available with each of these three items. The triangular icon toggles between orientations 116 and 118 in this example, but other embodiments are possible that do not diminish the scope, intent, or utility of the present innovation. These include other geometric symbols, alphabetic lists, or other methods and types of positional ordering as might be considered practical to those skilled in the art.

In this embodiment, section 122 is optionally employed for holding icons associated with alignment tools to precisely position elements of the user interface as the modeler prefers. The positioning of this or similar modeling functions is not limited to this location on a modeler's screen. Other embodiments are consistent with this innovation that may be more useful for a specific development effort. Alternative locations include positions in sections on the left or right side of the screen, allowing the modeler to dock this feature set as desired. Other functions or actions represented by other icons, such as the mode of operation, are optionally included in this section depending on other selections made by the modeler. Subsection 124 is shown as an open subsection allowing a modeler to incorporate custom components, inputs, or actions into the tool. (A custom component is one that has been developed or created separately by a modeler and integrated into the method or system of the present application.) As should be apparent to those skilled in the art, the text font and size, subsection box size and background color, icon shape/size/color/orientation, subsection boundary indicating marks, and other ancillary details are readily chosen from a wide variety of alternatives without affecting the purposes of these elements or limiting the operability of this application.

In typical use, the component of interest to a modeler is selected from one or more of the items in one or more subsections according to the intended objectives of the program being written. Components are chosen to be consistent with the computing device through which the method or system of the present innovation is being accessed or is intended to be operated. The selected elements are manipulated over to the workspace assembly area 106 and placed in the modeler's position of choice. Capabilities exist within any embodiment of this method or system to further select, move, size and alternatively align individual items or groups of items placed in the workspace assembly area to satisfy artistic, aesthetic or functional purposes at the discretion of a modeler. Additional subdivisions of sections of screen layout 100 allow the placement of optional support buttons or icons to handle such movement and alignment actions. The relative and absolute positions and various items of content are shown simply for purposes of illustration and are not limiting to the scope and capabilities of the present innovation.

Figure 2:
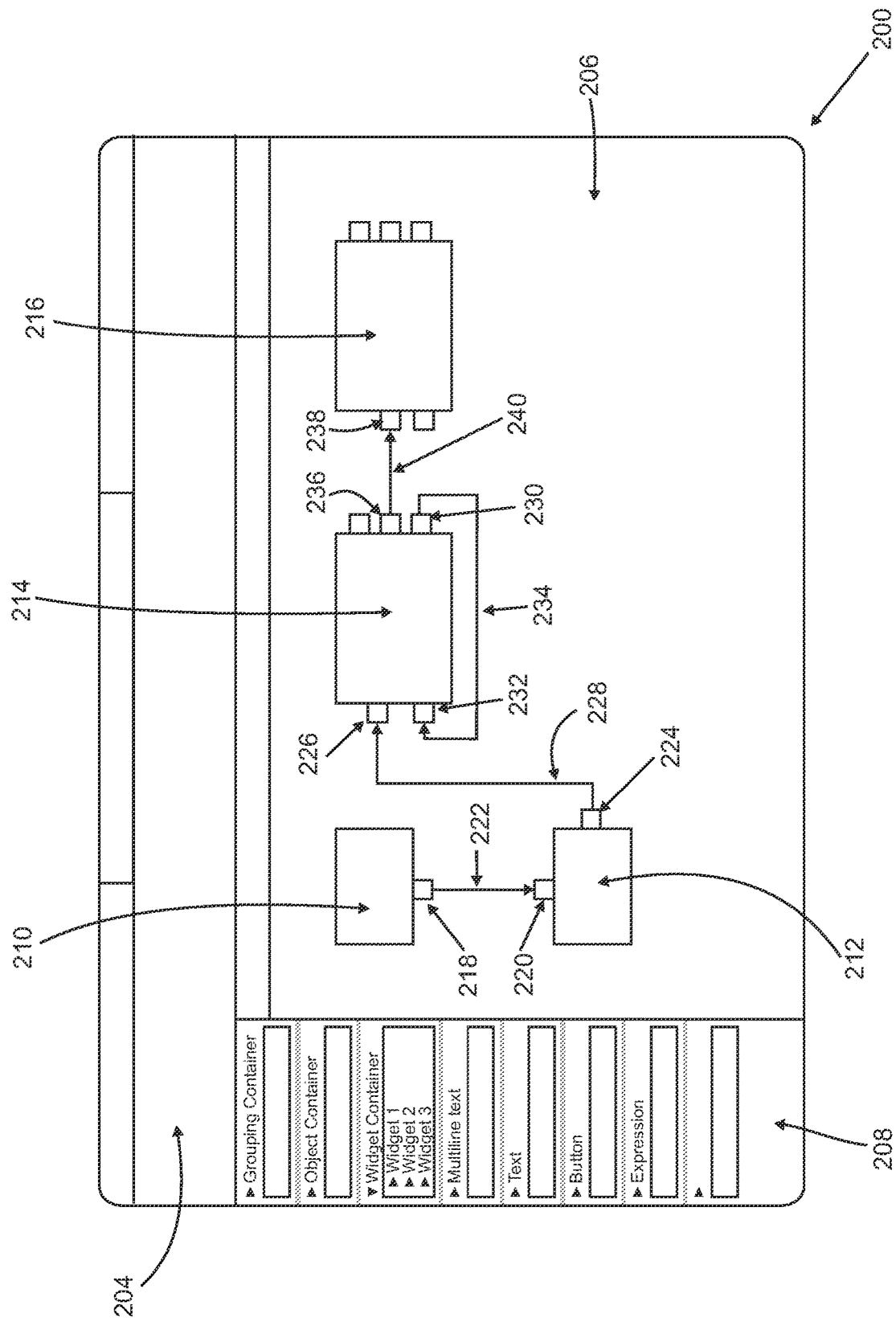
FIG. 2 illustrates one embodiment of a simple model for transmitting a message showing examples of connections between various components.

FIG. 2 shows an example screen layout 200 of a program model that illustrates several types of components and how they are optionally configured according to the method and system of the present application. Like the embodiment shown in FIG. 1, this FIG. 2 embodiment has workspace assembly area 206 that holds representations of various components manipulated from column 208. Also like FIG. 1, section 204 optionally includes the assigned names, action buttons, operating mode indicators, and other information variously positioned, none of which are shown for this example. Components 210, 212, 214 and 216 are representations of "widgets," while "magnets" are the small boxes attached to each widget. The lines drawn between magnets are "connectors" that indicate flow of data between widgets according to intended objectives of the modeler and operations of this development tool. In many embodiments, names are displayed for each widget on the graphical element to assist the modeler in the process of assembling the model. Assigned names are not shown in this illustration.

In the representative embodiment of a small application illustrated in FIG. 2, individual characters are collected in a buffer in the "textInput" widget 214 awaiting an action. There is no separate connection shown from a physical keyboard to a memory device storing characters since character data can originate from a variety of sources. A stimulating action is initiated through "onClick" widget 210, which symbolically represents the physical push of a button. Source magnet 218 connects to compatible target magnet 220 over connector 222, serving as a trigger for the "button" widget 212 to perform its function. When magnet 220 receives its trigger datum, button widget 212 provides a "transmit now" signal to tell widget 214 to send the contents of its buffer to "multiLineText" widget 216. Widget 212's action is conveyed as a trigger datum from the event-based source magnet 224 over connector 228 to compatible target magnet 226 that is part of textInput widget 214. When the data expressions in target magnet 226 execute, they copy the values in the input buffer of widget 214 to source magnet 236. With the overall design goal of supplying character-based content from a source to a multi-line display, source magnet 236 then sends text input data to compatible target magnet 238 of multiLineText widget 216 over connector 240. The multiLineText widget 216 then forwards data to the appropriate display peripheral.

A second data path is associated with textInput widget 214. To clear the textInput widget's data buffer after each completed transmission of data to widget 216, source magnet 230 carries a datum over connector 234 to compatible target magnet 232 that sets the value of the input buffer in widget 214 to empty. The effect of this information conveyed over connector 234 is to prevent the repeated transmission of the same data with another receipt of an activation through button widget 212. In general, the magnets ensure that the types of information moving across a connector are compatible from source to target. Note that although there is a requirement for matching the type between connected source and target magnets, the magnets do not necessarily have to reside on different widgets.

"Objects" are storage locations for the definition of the object, as well as for any data that is stored there. Examples of objects included in the method and system of the present application are widgets, magnets, and database tables, some of which are illustrated in FIG. 2.

In the definitions of the present innovation, widgets are graphical objects that represent an equation or a function when combined with specific magnets, and they are connected to other elements to achieve the goals of the modeler. Each widget must have at least one magnet of some type associated with it. The equation associated with each magnet exists to handle or process data, and the equation optionally relates to events. This method is in contrast with traditional programming languages that ordinarily have function definitions, function invocations, loops, or branching actions.

In at least one embodiment of the present application, magnets appear graphically as smaller boxes attached to a given widget. They are categorized as either "source magnets" or "target magnets" depending on whether their purpose is to provide data (source) or receive data (target). Magnets are not independent elements that can stand alone, as they must always be associated with a widget. All operational magnets must have an expression associated with them. A magnet is basically the data access port for a given widget. Each magnet has a type, and its type defines the connector role involving actions that are carried out on the data that flows through it. To make an allowable connection between a source magnet and a target magnet, each magnet must be of the same or a compatible type. This means that the source and target magnets have compatible connector roles. This ensures that data passing through them will be handled in a consistent way, eliminating data errors due to processing mismatches.

Magnet connector roles have four constituent parts that define the characteristic behavior and connectivity of the magnet. The four magnet connector role parts are identified as iomode, iokind, ioclass and ioname. The iomode attribute defines whether a magnet is a source or a target and is limited to this purpose alone. The iokind attribute identifies whether the magnet provides an "action", a "push" or a "value-change". An action iokind indicates a stimulus to an internal widget from an external source, an example of which is a keypress input from a keyboard or click on a user interface element. A push iokind, on the other hand, is an internally generated program event that creates an output or causes activity within the program sequence. A value-change iokind indicates that a value associated with a particular widget has changed. When it is in the form of an output, the value-change iokind declares the new value that the widget has acquired. When it is in the form of an input, the value-change iokind sets a new value in the widget.

The ioclass attribute defines classes of iokind attributes to more fully describe the iokind activity. For instance, there are ioclass action classes associated strictly with mouse actions or activity of user pointers through a 2D screen interface or 3D input device. Another ioclass action class is associated with network activity, as another non-limiting example. The ioclass push classes include but are not limited to an "event", "reset" and "error-event" classes. An event push class provides an output pulse with no internal change of state. A reset push class only appears as an input and returns the value of an internal variable to its default value. An error-event push class is an output that indicates an error has occurred.

The ioclass value-change classes include but are not limited to "delta", "complete" and "error" classes. Complete value-change classes are further distinguished as "input" or "output." A delta value-change class indicates that the value associated with a given transaction through a specific magnet pair is a delta from an existing value and not the value itself. Delta value-change classes represent either targets, meaning the widget should add the delta input to its current value, or sources. For sources, the widget value that is output from a widget through a magnet is a delta value from the previous value. A complete value-change class is either an input or output that represents the complete value of the widget, as opposed to a delta from a previous value. An input complete value-change class directs the widget to set the value in the widget to the value that has been input. An output complete value-change class indicates the value that the widget now has upon completion of its action. The error value-change class provides a value that is descriptive of an error that has been raised internal to the program operation. The error value-change is automatically triggered when an error-event occurs.

The ioname attribute provides a detailed name for a given connector role magnet so it can be identified uniquely by the program.

The collection of magnet connector roles supports the specificity of actions to ensure that data communicated through a magnet-connector-magnet pairing clearly defines the type of information conveyed so that there is no ambiguity. This characteristic of the innovation contributes to the ACID nature of its transaction log and data handling. The connector role attributes of magnets are administered within the application development program or system employing it. These attributes are transparent to the modeler and users, requiring no actions to carry out their activities. The primary action of these attributes is to make sure that source and target magnets are compatible with each other in terms of their data handling purposes.

The ability to generate output code according to the method and system of the present innovation is incorporated in the objects, connectors and embedded expression statements of a given program model. The method and system of the present innovation allow modelers to develop complete LCNC applications and short functional segments of application code in the visual programming environment described herein. This is accomplished using data flow expressions in which executed processing steps for changes in homoiconic data expression statements collectively comprise a transaction log that is both accessible at all times and that follows ACID rules. In this system and method, each processing step is indivisible and either completes successfully or the data returns to an immediately prior state in the transaction log. There is no interim state for data. This is the nature of an atomic process.

Any change to data from data flow expression processing steps maintains data integrity, keeping the data consistent within a system. Furthermore, each processing step in this system and method is discrete and independent of every other processing step such that there is no possibility of data interference from separate processing steps operating on the same data at the same time. Separate processes interacting with the same data could yield different results based on the sequence of interaction, which would be unacceptable. This concept of keeping processes separate is known as isolation and is another characteristic that helps maintain data integrity throughout program operations. Another aspect of the system and method of the present innovation is that successfully completed processing steps are permanently recorded in the transaction log such that constituent data is not affected by any other failures of the system. This makes the data durable.

Yet another aspect of the system and method is that transaction logs are accessible to at least one modeler in real time while the modeler develops the application. This allows inspection of the actions of the program as they are occurring to ensure execution is achieving the modeler's objective. The transaction logs are also concurrently accessible to additional modelers if they are participating in a joint development effort on the same model. This capability allows more than one modeler to simultaneously interact with elements used to create the complete code or segments of application code and the associated transaction log for a given application using a common visual programming environment. The fact that multiple modelers are able to design without interfering with each other or causing data corruption is a feature that allows for more rapid and assured development of application programs.

As part of the ACID characteristics of the transaction log of the present innovation, all changes to data that are recorded in the transaction log from actions of processing steps are documented and persistent. This feature allows inspection, rollback, and reversal of changes as desired by one or more modelers. This traceability is a cornerstone of system engineering. Such access to log data supports faster validation of program actions by the modeler(s) and easier correction of any errors discovered during execution. The data flow expressions of this homoiconic LCNC application development method and system are written in a simplified interface description language that provides easy readability by modelers without much or any formal programming training.

Figure 3:
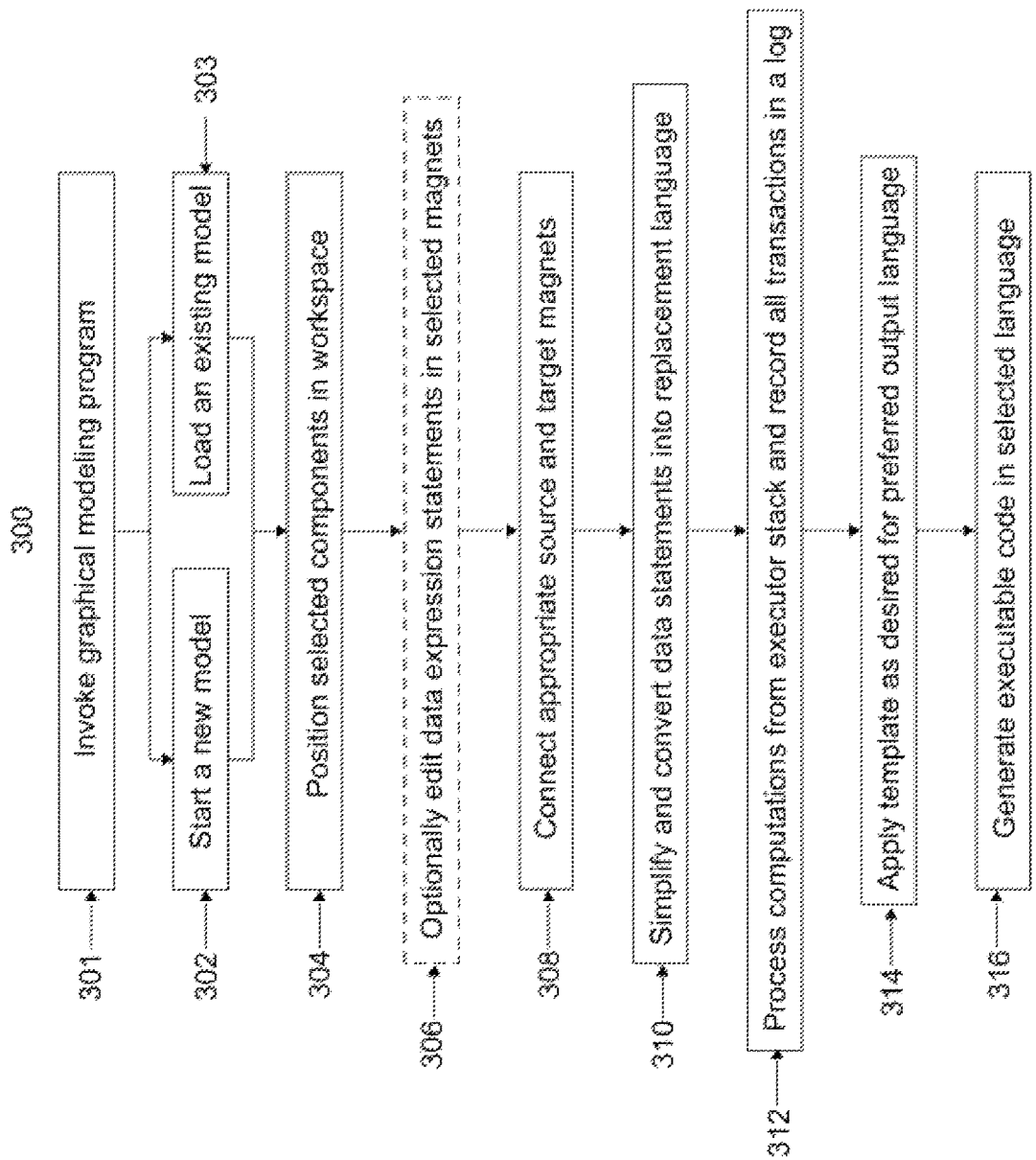
FIG. 3 is one example of a flowchart of steps for producing executable code in a modeler's preferred output language.

One embodiment of a representative operational sequence of steps to generate executable code in a desired language 300 is drawn in FIG. 3. After determining an objective for a given program, a modeler builds a program using graphical elements. The method and system of the present innovation incorporate a visual programming environment that includes an area on a 2D visual display screen or in a 3D visual space for at least one of the actions of placing, configuring, connecting, editing, and combining selected predefined or customized components to achieve at least one modeler's preferred objectives. These components include one or more widgets, connectors, composite widgets, network connections, or internal transport means in various combinations. The internal transport means provide connections between magnets on widgets to accomplish the purposes of the modeler(s).

Upon engaging a system or device supporting the method of the present innovation and invoking the LCNC application development platform 301, a modeler starts a new model 302 or loads an existing model 303 and manipulates one or more selected widgets 304 from available components in a hierarchical collection of components (for example, refer to items in column 208 in FIG. 2) onto the workspace assembly area (for example, refer to workspace assembly area 206 in FIG. 2) of the present innovation when the system is in the "Diagram" mode. A modeler visually constructs a program from at least one pre-existing, composite or newly defined widget. Composite widgets are made by grouping together a collection of widgets interconnected with each other through their respective compatible magnets in a preferred arrangement to suit a modeler's purpose. Building a composite widget is usually done to create an element with a unique purpose that is expected to be used more than once in future programming endeavors. Newly defined widgets are those in which a modeler has edited expressions, added additional magnets, or otherwise configured the widget so that it is not the same as a standard pre-existing widget ordinarily provided with a product built from and based on the method or system of the present innovation. In at least one embodiment, editing of data expressions in magnets 306 is performed with the system or method in the "Diagram" mode. Editing is an allowed but not required activity that is available to a modeler to provide greater flexibility in creating programs for a variety of specific purposes.

While building a graphical model for a desired purpose, a modeler makes connections 308 between compatible source and target magnets of the same type. Connections are made to achieve a modeler's objectives according to a predefined purpose. The magnet connector roles and associated attributes establish compatible connections and ensure that data moving through widgets is understood by the internal data processing steps of this application development method and system. Incompatible magnet connections are not allowed by the platform logic.

Each magnet has one or more assignment expressions associated with it that act on the data flowing through it. Some expressions have a mathematical or logical context and act like a numeric or Boolean equation. Magnets are required to follow standard mathematical or logical rules to generate a correct and predictable outcome. For example, a magnet may have an assignment expression equation of A=B+C associated with it. In the model and system of the present innovation, the right-hand side of any such equation has the assignment expression, while the left-hand side is an identifier, such as a named variable. The assignment expression verifies that identifiers that it references are magnets uniquely designating a specific widget. In the method and system of the present innovation, Boolean expressions such as A==5 or A>5 are also allowed, but there are no FOR, WHILE, or DO loops. The data assignment expressions collectively form the basis for the program code defined by the modeler through the visual arrangement and connections of components.

Compatible magnet-connector-magnet combinations form a function by combining the data expressions included in the combination. The data expressions move data from source magnet to target magnet and manipulate the data according to the intentions of the program modeler based on the graphical program constructed. Among other actions, such manipulation optionally includes assignments to some variables and the scheduling of trigger events for other elements.

When a connection is made between compatible magnets according to a graphical model, the Action Dialog engine forms intermediate data expressions that combine the data expressions of the two magnets to accomplish the modeler's purpose. This step simplifies and converts the homoiconic data expressions 310 to a set of expressions in a replacement language that represents the combined data manipulations. This "pseudo-compilation" is roughly analogous to known mathematical processes like reducing fractions or simplifying algebraic equations. The resultant intermediate replacement language expressions are only used internal to the method and system of the present innovation and are otherwise not exposed to users or modelers. The replacement language expressions are so named because they replace the combined data expressions included in magnets with a simplified internal intermediate source language for programs of the present innovation method and system.

For any actions that would trigger a computation or data manipulation step, a subset of trigger statements is included with a replacement language expression. The corresponding computational steps for these trigger statements are pushed onto a last-in-last-out executor stack for later processing. Trigger statements in general are derived from the collective assignment expressions for a magnet. Trigger statements form the computational steps that result in transactions being recorded in a transaction log upon successful completion. There are two types of triggering statements, explicit and implicit, optionally present in a magnet's set of data expressions. It is not necessary for both types to be present in a given magnet's data expressions. Explicit trigger statements are those that must be stated in their own data statements because they are not implied in other statements in a magnet's data expressions. Implicit trigger statements are not necessarily separately stated in a magnet's data expressions because they are easily implied from other statements therein.

During modeled program operation, events are triggered through any number of means including but not limited to keyboard inputs, internal or external timers, receipts of transmissions, and sensor inputs, among others. When a triggering event occurs, computational statements in the last-in-last-out executor stack are automatically processed 312. The oldest computational statement set is popped from the stack first and the code, represented as homoiconic data, is executed. After all computational steps have been popped from the stack, the transaction associated with this event is committed to storage in a transaction log that follows ACID practices, assuming no errors have occurred. If an error occurs, the transaction is aborted, and all changes associated with the triggering event are rolled back.

As part of this FIG. 3 development process, a modeler optionally validates program operation after the replacement language expressions have been generated. For an example embodiment involving a visual response that is to be displayed on a device defined in the program, a modeler enters "UI Run" mode to show the designed user screen in the workspace assembly area. In this way, the visual aspects of the user interface are available to be inspected. To further validate successful modeling, the modeler then provides the necessary initiating action through the modeler-defined means. As an additional validation in this embodiment example, a modeler optionally inspects the flow of data through the constructed visual program elements while the system employing this method is in the "Data Flow Path" mode. This inspection shows the path of data through a modeled program and displays locations of processing actions that occur on connected devices associated with this exemplary embodiment. The modeler has the flexibility to choose a desired programming language or user environment for which the method or system of the present innovation generates executable output code from the internal replacement language that represents the modeler's application or functional code segment. Modeler choices are made either during the model construction process or at any time at the discretion of the modeler. Executable code is internally produced on a continuous basis by applying one or more target language templates 314 to the replacement language code. Any time changes are made by a modeler to the model, executable code in the modeler-selected programming languages or for the selected environments is automatically regenerated. To ensure that an application always has the latest version of a model's code, the application checks against transaction logs corresponding to the source model each time executable code according to the present innovation is invoked in an attached device or environment. No modeler-directed action is required to activate the regeneration of executable code. This process is automatically undertaken for the selected target language templates designated by the modeler. The process is the same for any target language templates employed that correspond to the methods of the present innovation. Examples of output language templates are Tcl, C and JavaScript, but there are virtually no limitations on language types that can be converted from the replacement language.

It should be noted that automatically regenerated code is immediately in operation on devices that are attached to a system using the present innovation. This is conceptually analogous to browser content, for example, which is kept up to date dynamically at a source server whenever a computer is logged onto a given website. In contrast, devices or environments that are detached from the system of the present innovation must have their regenerated executable output code downloaded and installed anew when changes are made to a program model. This is necessary since the changes are not otherwise available to the detached devices without a fresh copy being installed. An example of a detached device is an embedded computer without an active communications connection to the host server employing the method of the present innovation.

Continuing with FIG. 3, executable code is generated by applying the collection of these intermediate replacement language expression statements to one or more target language templates 314 corresponding to existing programming languages. Target language templates are created according to translation equations from the internal replacement language expressions to the target language expressions. Once a template has been created for a given language, this method or system has the capability to convert the internal replacement language to executable code in that language. Therefore, the method is extensible to languages that have not yet been developed but that follow traditional mathematical or logical processes. This future-proofing capability provides significant utility and immense commercial value, since models that meet objectives are easily generated in new languages or later versions of operating systems without redesigning the model.

Examples of languages for which target language templates are suitable at the time of this writing include but are not limited to Python, JavaScript, Java, C, C++, C #, Go, R, Swift, PHP: Hypertext Preprocessor (PHP), Structured Query Language (SQL), HyperText Markup Language (HTML), Cascading Style Sheets (CSS), TypeScript, Bash/Shell, Visual Basic, LISP, Tcl, Ruby, Rust, Perl, Common Business Oriented Language (Cobol), Fortran, and Pascal, among others. In addition, templates generate output code based on server-side operating systems regardless of where the servers are located. The method and system of the present innovation generates output code that accurately targets each of the selected operating environments. Returning to FIG. 3, the application of a template converts data expressions in a user-created program model to conventional lines of executable code in one or more selected languages 316. Depending on the target processor, the system and method of the present innovation may perform step 312 after step 316, and it will have no perceptible impact to the modeler or user. A significant advantage of the method and system of the present innovation is that techniques described herein perform conversions of data expressions into executable code in a programming language without requiring a working knowledge of the target language syntax and grammar.

For the method and system of the present innovation to produce appropriate output code, the modeler defines the target devices or operating environments of interest. This choice or set of choices is made at any time: prior to modeling, during modeling, after modeling, during operation, or at later times after other executable codes have been generated. Templates that match the selected devices or environments are then applied to the replacement language code that the modeler has constructed in order to create the desired output executable code modules.

Figure 4:
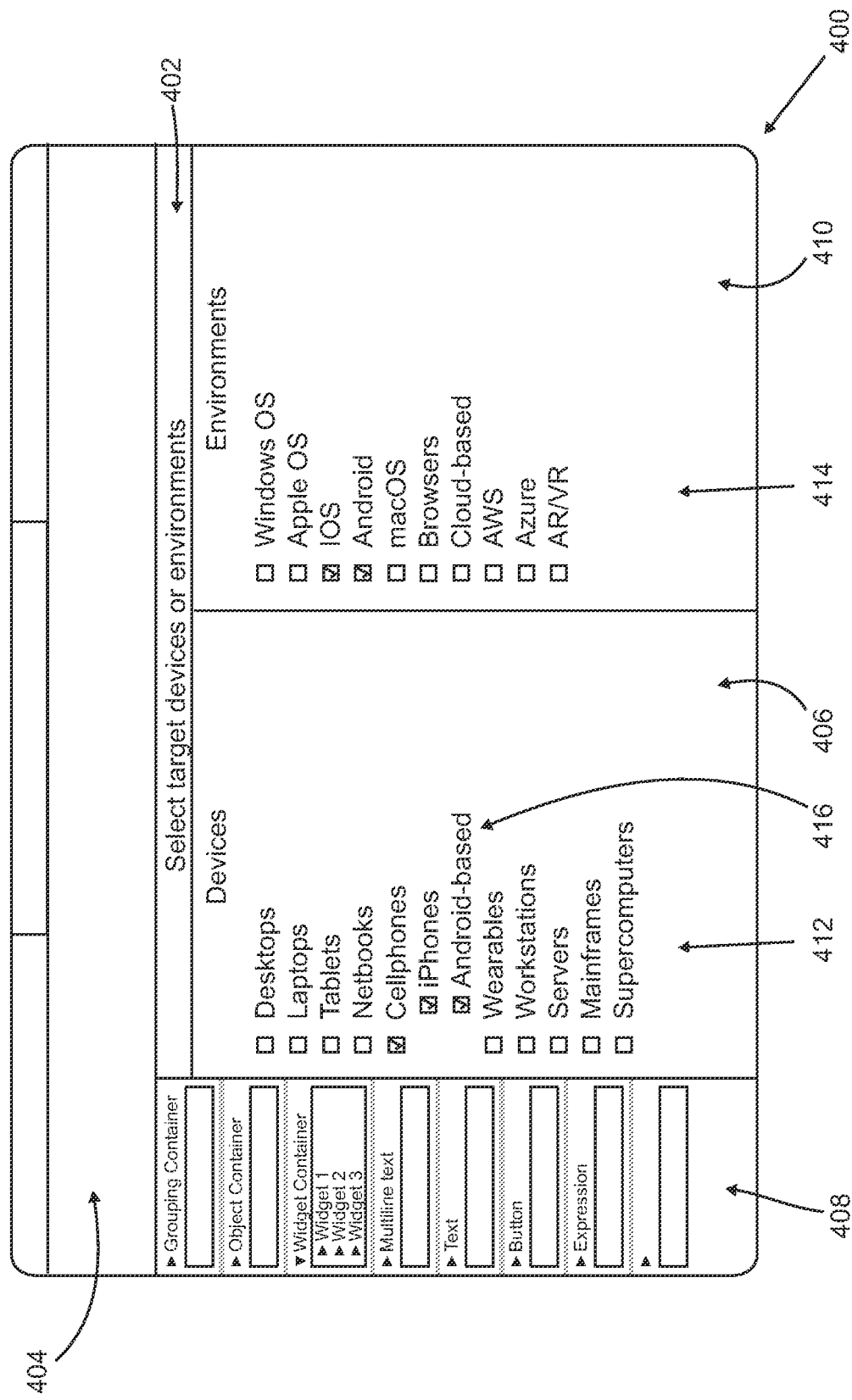
FIG. 4 illustrates one embodiment of a screen layout for an output code selection screen.

FIG. 4 illustrates one embodiment 400 of many possible selection screen layouts. This embodiment shows radio buttons, but other methods are suitable, including search boxes, alphabetical lists, drop-down boxes, and other methods as are used in selecting among several choices. In this illustration, the workspace area is subdivided into a Devices section 406 and an Environments section 410. Section 402 identifies the purpose of this configuration screen by directing modelers to choose where the intended application will be employed. As with other embodiments, section 404 displays various types of information. Examples of such information are the name assigned to the program by the modeler, buttons to direct concluding actions such as "Save", "Close" or "Regenerate code", indicators for mode of operation, and mode-specific and other information that is potentially of interest to a system modeler or end user. Column 408 may alternately display modeling components or be grayed-out, minimized, vacant, or used for displaying other information useful during this selection process. The presence of and content contained within section 408 as shown in this illustration are not limited to the items listed, and this section is alternatively used for other purposes. A list of potential target devices 412 is shown within section 406 in this illustration. Similarly, list 414 identifies a variety of example environments from which a modeler could select. The items in these high-level lists are shown merely for illustration and are not limited in style or content to the items shown.

In an example operation of this embodiment, a modeler moves to the Selection screen through one of several non-limiting techniques available in the method or system of the present innovation. Examples of techniques for moving to the Selection mode include visual buttons displayed in section 404, assigned keys or key sequences on a model development device running the application development software, gestures using positional or motion-based input devices, or other means. In one embodiment, upon selection of a target device or devices in list 412, the corresponding environments for those devices in list 414 are optionally similarly highlighted as selections. Selection is alternatively initiated through choice of target environments with corresponding devices optionally being highlighted because of the selection. The combination or dissociation of selections illustrated herein is not limited to this example, and many other possible mechanisms and combinations are within the scope of this innovation. The selected devices and/or environments are retained with the metadata for a given model when the model is saved or stored.

Furthermore, in this example operation, selection of a device from lists 412 or 414 optionally expands the list item to allow better specificity by the modeler. For instance, a modeler who intends to develop an application for all types of cellphones selects the check box for Cellphones, which expands the list to items 416 and automatically checks all the boxes in the expanded list that arises from this choice. If a modeler is only interested in developing an application for iPhones, the Android-based box is then unchecked. This action consequentially unchecks the Android box in the Environment list 414. In this manner, the method and system of the present innovation expand from higher level to more specific details as necessary to identify the software elements necessary to produce appropriate output codes when code is generated or regenerated after model changes.

It is an advantage of the present innovation that a selection mechanism efficiently supports simplified identification of necessary software elements to ensure operation in an intended setting. Through this technique, only a finite set of templates is needed to produce the correct outputs. It is a further advantage of the present innovation that selection by a modeler is available either before, during or after modeling, so a modeler does not have to specify and design for a single circumstance from the beginning of the development process. Once a model is completed and satisfactory to a modeler, output code generation occurs, and additional environments are optionally added just by selecting them. No model rebuilds are necessary to accomplish this. In this way, the program model is not limited to a single potential implementation scenario. This advanced feature is in contrast with most programming languages and application development programs, in which the user environment and deployed system devices must be known in advance to create working code.

It is yet another advantage of the method and system of the present innovation that employing a combination of devices and environments by selecting from one list or the other supports validation of the intended targets to satisfy necessary platforms or device uses. This occurs due to cooperative linking of the two lists.

The selection of target devices or environments results in the generation of specific executable output code for all components in a target user configuration or system. In this way, a process running on one processing element or CPU is able to communicate with other processing elements on other devices. The correct communication protocol to support each device is supplied through the code generation process. The method and system of the present innovation generates targeted output codes for all platforms involved without requiring the identification of communication protocols in the model.

The example operational sequence of steps to generate executable code in a desired language shown in FIG. 3 illustrates construction of an application program from scratch using elements of the present innovation. However, there are circumstances in which modelers or computer programmers have already built and tested code segments or modules of their own with specific purposes. It is a feature of the method and system of the present innovation that modelers are able to connect and configure various components with externally generated custom code modules written in a compatible programming language and interface with them in a modeled application in addition to or in place of one or more predefined data flow components ordinarily included with the tools of the system and method. An example of a custom code segment is a set of commands to an industrial controller using the controller's application programming interface.

The method and system of the present innovation interact with custom user code in the form of a shared object library. This technique is well known in the art of computer programming. For example, Microsoft provides custom code external to a program and calls it a dynamic linked library or DLL. To engage external code, a modeler creates a new widget and declares the function, argument types and return types, as appropriate for a given function. The declarations are included as part of the replacement language expressions for the widget and its magnets. Both in-process and out-of-process function calls are operable through the present method and application with inclusion of calls that form a widget's data expressions. Out-of-process calls are potentially subject to delays due to network operations.

Figure 5:
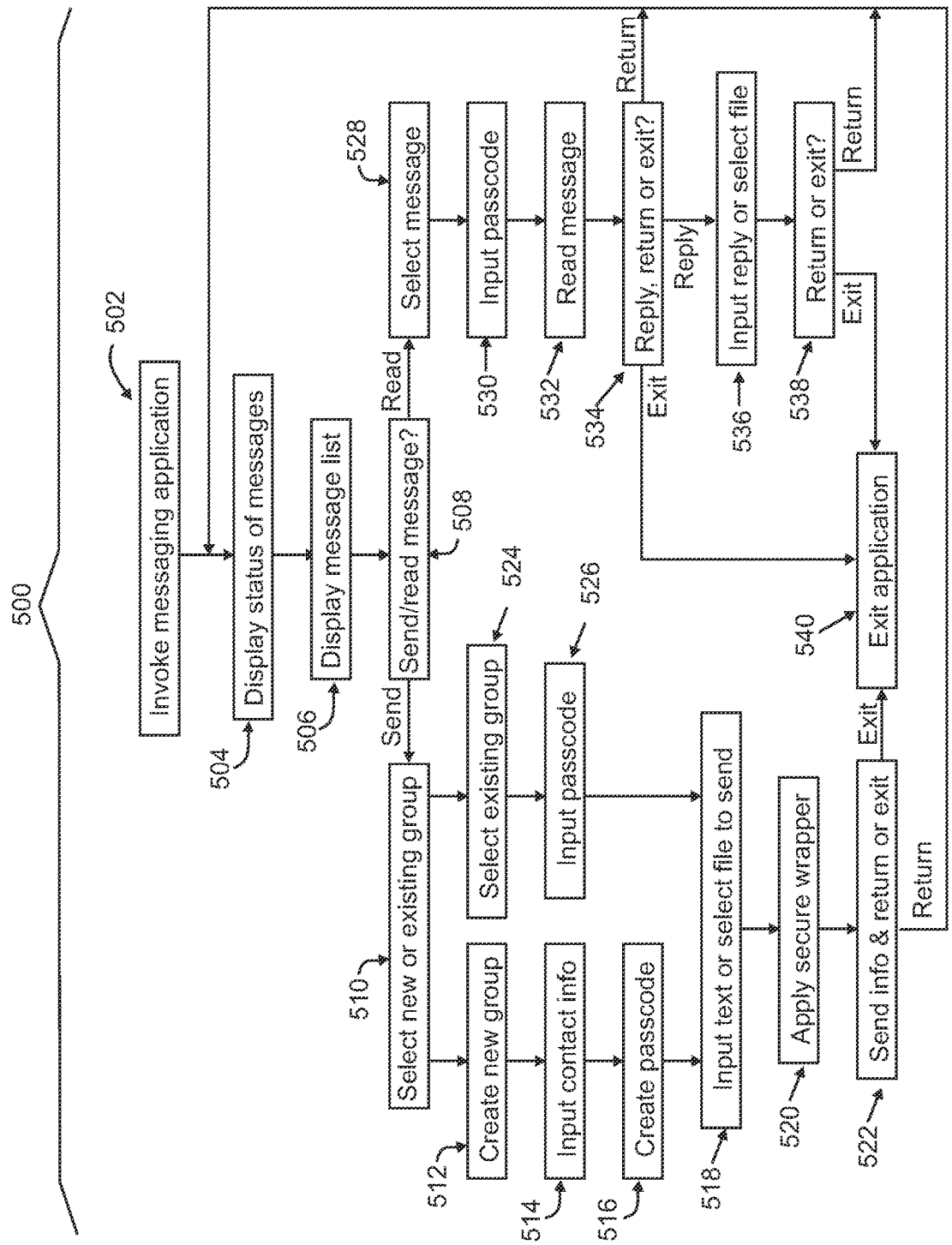
FIG. 5 is a flowchart for one embodiment of operation for an example secure group messaging application that is possible to build according to the method or system of the present innovation. The operational flowchart is derived from the requirements documents developed for a representative messaging application.

To illustrate the utility of this innovation, FIG. 5 is a flowchart for one example embodiment of end user operation for a secure group messaging application 500. The purpose of the flowchart is to define a set of objectives from which the modeler generates his or her application code. An embodiment built to match this flowchart illustrates the agility of this LCNC homoiconic method for communicating with and deploying to a wide variety of device types such as laptops, phones, clients, and servers without special handling or tuning of an output code. This model represents a simple example and is not meant to be limiting in content, extent, technology, method, or other factor. After invoking the secure messaging application 502 on a suitable device, the program automatically indicates the status of messages 504 for this user. Validated identification of the user is not considered part of this program model. The status preferably reflects the number of existing messages already read, new messages that need to be read, messages queued for sending, messages awaiting a communication channel (e.g. Wi-Fi), or other information of potential interest as configured by a user. Configuration actions and mechanisms are secondary to this illustration and are thus not detailed here. After seeing a list of messages 506 with optional highlighting of new unread messages, the user chooses 508 between the options to read one of those new messages at a time 528 or to send a message 510 instead at this time. If the user wants to send a secure message at this time 510, the user either chooses an existing predefined group of recipients 524 or creates a new group 512 of at least one member. Obviously, a group of one member is an individual, but the operation could proceed as shown in this example figure. An existing group will already have had a passcode defined, so the user will optionally input that passcode 526 anew to indicate the validity of the message source to a receiver. Alternatively, the user has previously potentially configured the application to store passcodes so they do not need to be input during each use of the application from a known personal device. Other defaults and features are reasonable to include and can be foreseen by those skilled in the art, so they are not listed here.

For new groups or individuals who have not previously been sent a secure message from this originator, a new group is first created 512. The contact information for the individual or for each member of the group is input into the messaging application 514. Such information optionally includes full name, email address, phone number, preferred device destination(s), or other information as might be considered useful. A passcode is then created 516 and conveyed to each member of the group by a secure means. Whether this message is intended for a new individual or group or for an existing group, the message is then created by text input or a file is selected to send to the target user 518. The application applies a secure wrapper or encryption to the message 520 and the message is then sent 522, after which the application either returns to the message display screen 504 as at the beginning of operation or exits the application 540.

In cases where there is one or more new messages to be read and the user has chosen 508 to read them, the message is selected 528 and the secure passcode is input into the messaging application 530. Alternatively, and within the scope of reasonable operation, the messaging program allows configuration capabilities that provide alternative means of identifying the user or freedom to choose storing the passcode with the program or on the device. Additionally, the program is configured alternatively for the use of a single passcode for all conversations or a separate passcode for each user or group. Once the message is read 532, the user has the option 534 to return to the message status display screen, input a reply or select a file to transmit in response 536, or exit the application 540. After sending the file or loading it in a queue for later transmission, the user then chooses 538 either to return to the message status display screen 504 or exit 540.

Figure 6:
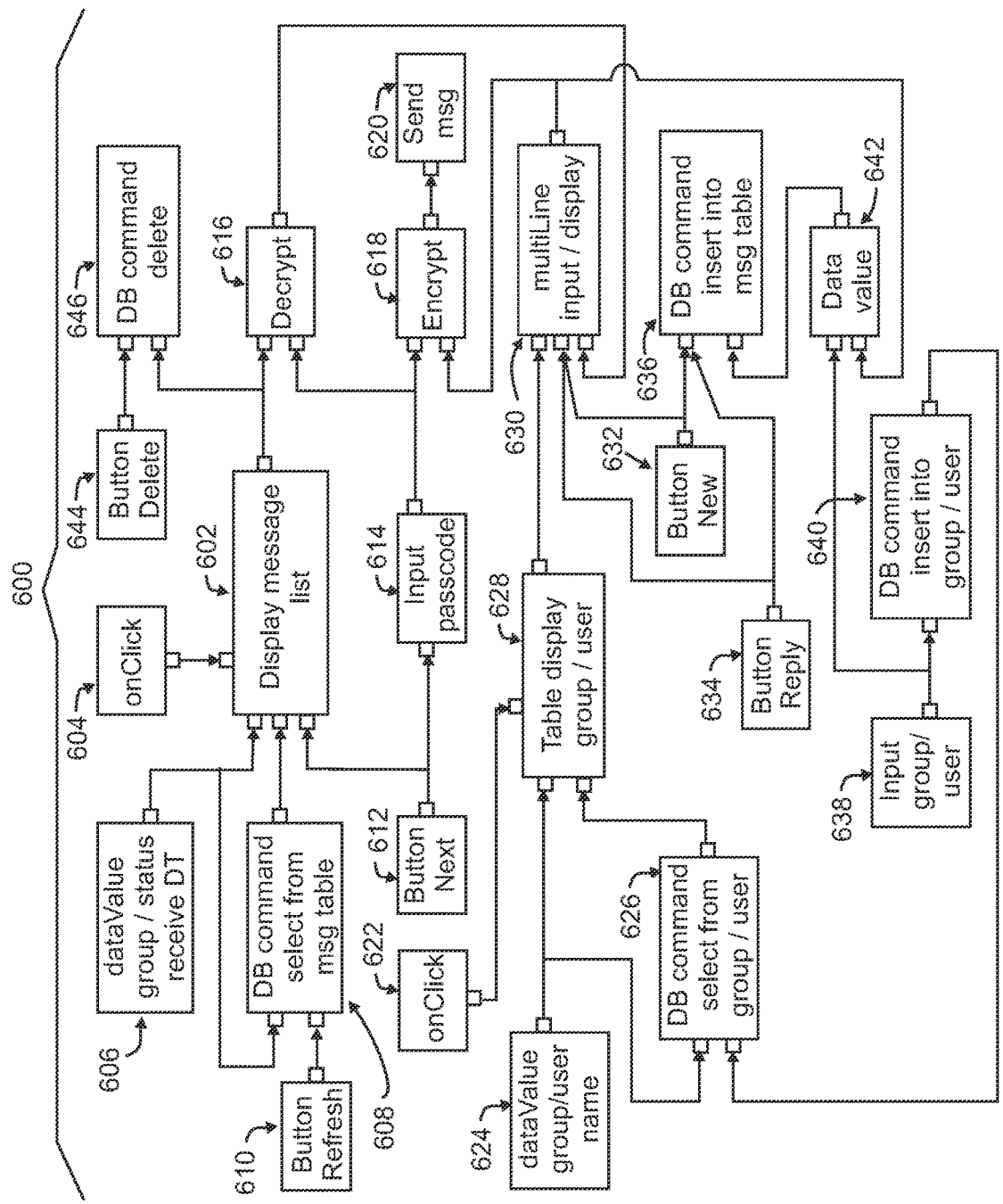
FIG. 6 illustrates one embodiment of an assembled model for the aforementioned secure messaging application built according to the method or system of the present innovation.

FIG. 6 illustrates one embodiment of an assembled model 600 for the secure messaging application operationally outlined in FIG. 5. This model illustrates one embodiment of the collection of components and connections employed to achieve the purposes in FIG. 5 according to the method or system of the present innovation. Only the graphical elements that would appear in the workspace assembly area are shown in FIG. 6. This model presumes the existence of a multivariate storage location to hold users, groups and existing message content that are accessed by the application being modeled. The modeler necessarily connects widgets through compatible magnet types on each widget, so these are not separately described in this illustration. Use of the subject application begins with the initialization of the application on a selected device by a user. From the operational steps shown in FIG. 5, the secure messaging application 502 is invoked on a suitable device and automatically indicates the status of messages 504 for this user.

Referring now to FIG. 6, the display of a list of existing messages and respective attributes for each message is handled by "Display message list" widget 602. The functions of this widget correspond to operational steps 504 and 506 of FIG. 5. The user can optionally refresh the list of messages through the "Button Refresh" widget 610. For existing messages in storage, the "onClick" widget 604 selects the message of interest to the user. This function corresponds to "Select message" operational step 528 in FIG. 5. Several actions are then facilitated for the selected message. If the message is no longer wanted, it can be deleted through the "Button Delete" widget 644, which directs the storage location to eliminate the message through the "DB command delete" widget 646. Another alternative action is to read the selected message identified in the buffer of the Display message list widget 602. Since the purpose of this application is to send and receive secure messages, the selected message must be decrypted to be read. This function is accomplished by the "Decrypt" widget 616, which sends the decrypted message to the "multiLine input/display" widget 630. Widget 630 incorporates the functions of displaying the just-decrypted message, displaying a new message put in by the user, and offering actions in response to message content. These functions correspond to operational steps 532, 518, and 534 respectively of FIG. 5.

Returning to FIG. 6, the facility to establish a new user or group with which to correspond is provided through "Input group/user" widget 638. The functions supplied by this widget correspond to operational steps Create new group 512 and Input contact info 514 from FIG. 5. Input group/user widget 638 activates the "DB command insert into group/user" widget 640 to store the new user information in the application's storage means. The inputting of a user group through widget 638 also supplies message data through the "Data value" widget 642 to be stored in the multivariate storage location as directed by "DB command insert into msg table" widget 636. The data thus supplied is either associated with a new message to be sent or a reply to the currently selected message. Association with a new message or a reply message is directed by activation of the "Button New" widget 632 or the "Button Reply" widget 634, respectively. The Button New widget 632 corresponds to operational step 510 in FIG. 5. The Button Reply widget 634 corresponds to operational steps 534 and 536 in FIG. 5.

If the user chooses to scroll through the list of messages, the "Button Next" widget 612 engages to identify the message of interest. The appropriate passcode is then applied through the "Input passcode" widget 614, after which the message is decrypted through the Decrypt widget 616. The information contained in the message is viewed by actions of the multiLine input/display widget 630, which sends the content to the selected peripheral display device.

Continuing with FIG. 6, the information for existing users and groups in loaded into the buffer for the "dataValue group/user name" widget 624 upon invocation of the application. This widget is connected with the "DB command select from group/user" widget 626, which provides the function of identifying the selected group or user in the multivariate storage location for use by the application. Widget 626 corresponds to the "Select existing group" operational step 524 in FIG. 5. User or group information is made visible after selection through the "Table display group/user" widget 628 upon stimulation of its associated "onClick" widget 622. The information requested is viewed by actions of the multiLine input/display widget 630, which sends the content to the selected peripheral display device.

For new messages to be sent in this secure messaging application, an authorization passcode is created in the operational step 516 in FIG. 5. This function is accomplished through the Input passcode widget 614 in FIG. 6. This validating widget performs the same functions for the corresponding operational steps 526 and 530 in FIG. 5, steps that are associated with existing users or groups or received messages. Once a passcode has been supplied to associate with a new message, the message displayed through multiLine input/display widget 630 and passcode provided through Input passcode widget 614 are encrypted for transmission in the "Encrypt" widget 618 and sent through "Send msg" widget 620. The encryption and sending actions correspond to operational steps 520 and 522 respectively in FIG. 5.

Figure 7:
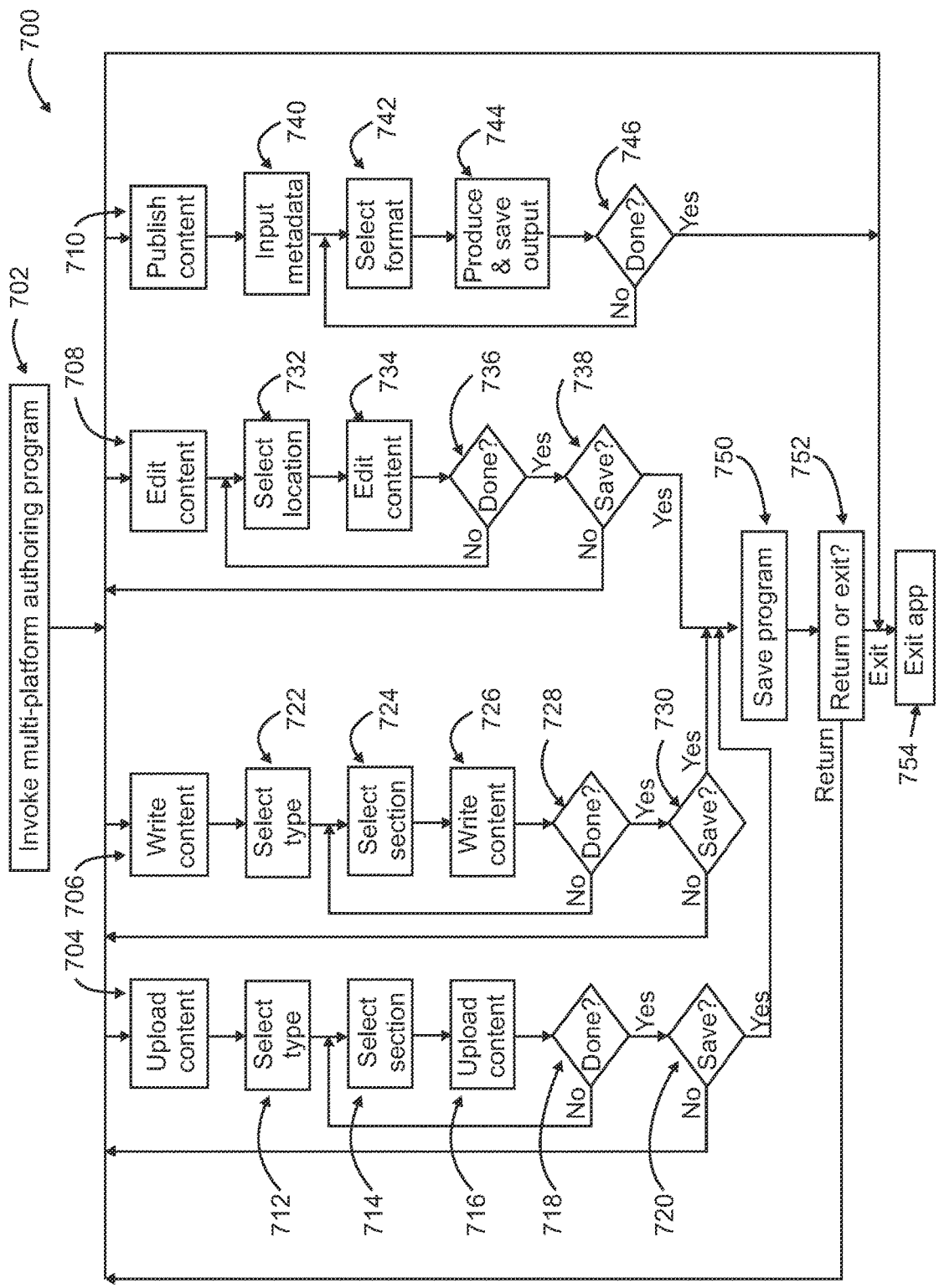
FIG. 7 is a flowchart for one embodiment of operation for an example authoring program that allows users to write and publish short stories, poems and books according to the method or system of the present innovation.

As another example, FIG. 7 is a flowchart for one embodiment of operation for a multi-platform authoring program 700 that allows users to write and publish original short stories, books, poems, or other content. The purpose of the flowchart is to define a set of objectives from which the modeler generates his or her application code. Such program is constructed using the LCNC application development method or system of the present innovation. This model represents a simple example and is not meant to be limiting in content, extent, technology, method, or other factor. This flowchart represents an application that can be deployed to any computer platform or device without having to modify the executable code derived from the program model specifically for that platform or device. After the initial step of invoking the authoring program 702 built according to the method or system of this present innovation, the user of this program chooses between uploading content already written on another device 704, writing new content from scratch 706, editing content that is already partially written and loaded into this application 708, or publishing completed content 710. This minimal set of optional actions is provided for the purpose of illustration and is not limiting regarding other programming actions or steps that could be made by a modeler.

When a user chooses to upload content, a first optional action in this example embodiment is to select a type of content 712 that the user intends to produce. Examples of types include novels, short stories, poems, and documentaries, among other types of written content. To place this uploaded content properly, the user selects the section of the planned written document 714 in which to load the content. Content is then uploaded 716 through conventional input means available on the user's device. The choice is then offered to continue uploading other sections or proceed to a save operation, at which time the program asks the user if the upload operation 718 is finished. After one or more uploads have been completed, the user is asked whether a save operation is desired in step 720. If a save is not desired, the program returns to the screen that follows the authoring program invocation step to allow the user to carry out other optional actions. If a save is desired, the action is carried out in step 750, and a choice is made 752 either to return back to the beginning following the invocation step, or allow the program to be closed 754.

When a user elects to write new content from scratch 706 and input the content on their device, a type of written document is first selected in step 722. Since the author could prefer to write some sections before others in a nonlinear fashion, the user is prompted in step 724 to select the section in which to add the content. Written content is then input into the device in step 726. The user is then asked whether the writing effort is complete at that time in step 728. The user may not be done if additional writing is to be undertaken at that time in another section. As with other optional paths, the user is asked whether a save operation is desired 730. If a save is not desired, the program returns to the screen that follows the authoring program invocation step to allow the user to carry out other optional actions. Content just written is thereby discarded after an optional warning choice. If a save is desired, the action is carried out in step 750, and a choice is made 752 either to return back to the beginning following the invocation step or allow the program to be closed 754.

Another optional sequence of actions is associated with editing existing content 708, which carries the assumption that some written content has already been created and made accessible to the authoring program. This portion of the operation flowchart is also appropriate for adding new chapters or sections to an existing work. The user selects the location of the written material to be edited or added 732 and then edits or adds the content 734 as desired. In step 736, the user determines whether he or she is done editing. If not done editing, the user returns back to a screen that allows a location to be edited 732 again. As with other optional paths, the user is asked whether a save operation is desired 738. If a save is not desired, the program returns to the screen that follows the authoring program invocation step to allow the user to carry out other optional actions. If a save is desired, the action is carried out in step 750, and a choice is made 752 either to return to the beginning following the invocation step or allow the program to be closed 754.

Once a story, poem or other written content is complete to the author's satisfaction, the publishing sequence is available to begin in step 710. The author inputs the appropriate metadata 740, which may include author's name, copyright date and owner, publishing location, table of contents, ISBN number, and other types of data as available in the program as it has been configured by the user or input by the user. When all metadata and written content are incorporated to the author's satisfaction, the user selects the publishing format 742 of interest. Some non-limiting examples of document publishing formats include HTML5, EPUB, interactive PDF, printable PDF, and audio. It is presumed that the content is made available for transmission to potential readers through another unspecified step and means that may or may not be monetized. The user then has the program produce and save the content in the chosen format 744. If the user is not done 746 with producing readable versions and additional format versions are desired, the program returns to the format selection step 742 to produce them. When all desired actions have been completed, the authoring application is closed, and the user exits in step 754.

The LCNC application development program operating according to the method or system of the present innovation illustrates the ability to handle multiple types of content prepared through various modalities, optionally modified and finally produced in one or more of numerous data formats.

Figure 8:
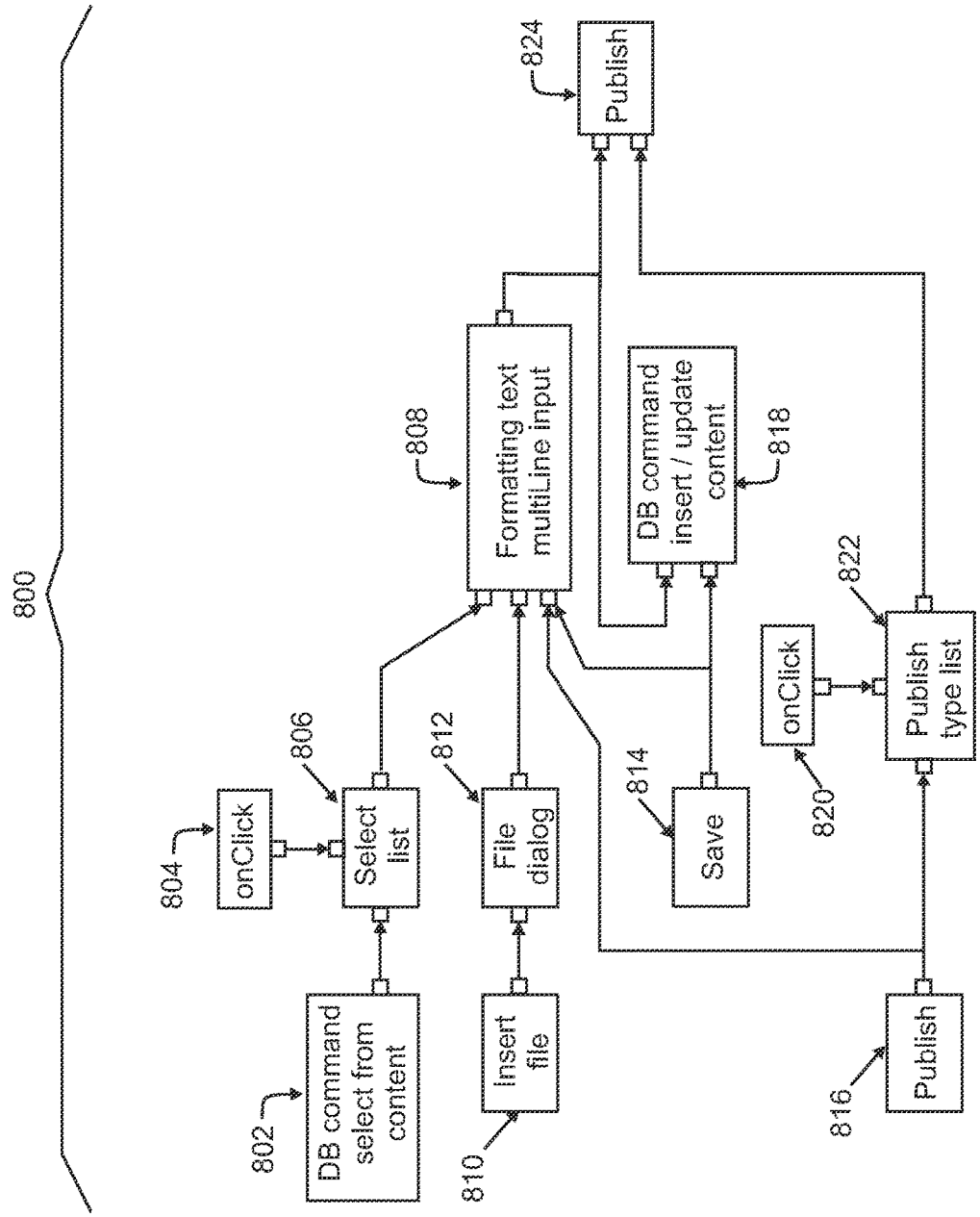
FIG. 8 illustrates one embodiment of an assembled model for the aforementioned authoring application built according to the method or system of the present innovation.

FIG. 8 illustrates one embodiment of an assembled model 800 for the aforementioned authoring application built according to the method or system of the present innovation. Only the graphical elements that appear in the workspace assembly area are shown in FIG. 8. This model presumes the existence of a database that holds the written content on which the author/user will work. The modeler necessarily connects widgets through compatible magnet types on each widget, but the magnets are not separately described in this illustration. In this implementation, the "Formatting text multiLine input" widget 808 receives data from "Select list" widget 806 when stimulated through "onClick" widget 804. The Select list widget 806 maps to the "Edit content" widget 708 in FIG. 7. The written content to be edited is first selected by the user to begin the editing process. The previously written content is selected by the user through the modeled function "DB command select from content" widget 802. The purpose of this widget is to access the database of written content and present a list to the user in widget 806 from which the user selects content to edit.

A user is optionally editing content written by another party, an action illustrated by operations 704-720 in FIG. 7. The "Insert file" widget 810 sends data to the "File dialog" widget 812, corresponding to the "Upload content" operation 716 in FIG. 7. The uploaded content is sent to the "Formatting text multiLine input" widget 808 for handling through its prescribed functions. Widget 808 displays the user selection of type of content and the specific section of the content to be addressed. These functions correspond to operations 712, 714, 722, 724, 732 and 734 from FIG. 7. Formatting text multiLine input widget 808 also handles the inputting of characters of new content corresponding to the "Write content" widget 706 of FIG. 7.

Continuing with FIG. 8, the buffer potentially holding multiple lines of text in widget 808 is also responsive to user actions to save the content and to publish it. The "Save" widget 814 performs the functions corresponding to save operation steps 720, 730, and 738 in FIG. 7. The action to save the content is carried out by the "DB command insert/update content" widget 818. It directs the applicable system to perform the actual "save" operation in a storage means such as a database, corresponding to operational step 750 in FIG. 7. From a functional standpoint in FIG. 8, DB command insert/update content widget 818 receives written content data from Formatting text multiLine input widget 808 and a directive to save that content from Save widget 814.

With an overall user objective of publishing written content, the file format of the content must be selected. This is accomplished through the "Publish type list" widget 822 in FIG. 8, corresponding to the "Select publishing format" operational step 742 from FIG. 7. Upon the user direction through "onClick" widget 820 to generate the appropriate file type, the "Publish" widget 824 produces the file using content from Formatting text multiLine input widget 808. The publishing action is represented by operational step 744 in FIG. 7.

Various but not all computing systems consist of a plurality of processors, some of which are co-located within a single device but others of which are distributed among multiple devices or platforms. An example is a client-server arrangement in which multiple clients within a corporation are connected to one or more servers to share programs, data, storage, or other resources. Similarly, cell phone networks move applications and data between arrays of redundant phone company computers and independent cell phones that are in the possession of geographically distributed consumers. The characteristics of the method and system of the present innovation make this application development platform particularly effective at optimizing for one or more selected parameters of systems with multiple processing units.

As described earlier, when a modeler has visually constructed and completed a program design, all possible paths of execution are known because of the data expressions associated with magnets, connectors, and optional added code modules. This information is present prior to the beginning of runtime computations. The paths of execution provide significant metrics with respect to performance and efficiency. For example, identifying the processor on which a data expression will execute informs the modelers about realtime performance expectations, overall speed of execution, and data concentration points for a given application program model running on a given set of devices.

In the method and system of the present innovation, it is practical to distribute the associated processing actions for portions of data flow expressions among available connected device and subsystem processors to configure an operating environment optimized for at least one of various connected device and subsystem attributes. These attributes include realtime performance capability, overall speed of execution, availability of network and bus connection resources, available output devices including display screens and audio output elements, memory availability on assorted platforms of execution, power availability on assorted platforms of execution, and data concentration points. Collectively, these data points and metrics are available to the modeler to manually direct processing tasks to assorted distributed processors in a known system configuration according to modeler or user preferences. To make an analysis of options more convenient, this collection of metrics and parameters is recorded in a table, database or other structured form for the benefit of analyzing the different choices.

The primary advantage of documenting these metrics and subsystem attributes in a database or tabular structure is that it allows the modeler to establish a system configuration organized and optimized for at least one from a set of connected device and subsystem attributes by directing execution steps to each processor as desired. For example, if a modeler's primary consideration is the speed of execution, the modeler directs more computation-intensive calculations to faster processors with sufficient memory to provide a short execution duration. On the other hand, if power utilization is critical for portable processors running on battery power in a particular system configuration, processing is preferably directed to devices and subsystem processors that are provided with continuous power, even if this comes at the expense of speed of execution. It should be clear to those skilled in the art that balancing and optimizing for a plurality of factors rather than just one is readily achieved through this method as well. Thus, it is a feature and advantage of the method and system of the present innovation that a modeler is enabled to direct the distribution of associated processing actions of portions of data flow expressions in order to optimize for a desired outcome.

With the availability of a database having the aforementioned collection of metrics and subsystem parameters, the method and system of the present innovation are also able to distribute associated processing actions for portions of data flow expressions as directed on an automated basis according to preselected modeler preferences regarding subsystem attributes in consideration of interconnection capabilities and available resources of connected devices and subsystems. This is accomplished by calculating the various possible outcomes of distributing associated processing actions for portions of data flow expressions in consideration of interconnection capabilities and available resources of connected devices and subsystems with the LCNC application system or method selecting the distribution. In addition to such preliminary simulations, configured code is alternatively executed on a server in a test harness, gathering results of each run for analysis. The results of such automated tests are recorded in a database or tabular structure for statistical analysis of the selected parameters of interest. After analysis of parameters for a given function in various available programming languages, the database of recorded results is used to provide optimal distributions of processes and preferable output languages according to a modeler's general preselected preference.

There are both benefits and limitations to employment of this technique. Some benefits include the recognition of inherent processor and power shortcomings of portable devices and the performance improvements available by shifting processes to more powerful servers. This benefit is the identification of potential data processing concentration points in a given configuration and the automated adjustment to overcome the problem. Examples of connected devices that have limited processing, power or I/O capabilities are smart watches, Internet-of-Things units, and tablets. An example of a limitation to this automated optimization is the location of input means and their associated processes, which are usually expected at specific devices in a given configuration. For instance, smart watches have only a minimal battery life and limited I/O capability. Similarly, certain outputs are often required because of display features or necessary device portability. There are also restrictions on what can be accomplished through browsers in terms of direct database access and direct email connectivity.

Notwithstanding the potential noted limitations, the possible benefits of having a system automatically distribute processes among connected devices of a given system are beneficially enabled through the methods and systems of the present innovation. They provide significant benefits over other LCNC application development platforms and tools.

While various embodiments have been described through examples and explanations, these are not necessarily limiting to the extent of related implementations consistent with the methods and systems of this innovation. This explanation and application are therefore intended to cover similar embodiments and implementations as would be apparent to those skilled in the art, and it is to be accorded the broadest allowance in scope as allowed by law according to the claims listed below.

What is claimed is:

1. A method for developing low-code and no-code software applications in a visual programming environment using homoiconic data flow expressions to define model processing steps, the method comprising:
   invoking a graphical modeling program;
   starting or loading a model in a visual workspace, wherein the visual workspace is two-dimensional (2D) or three-dimensional (3D);
   manipulating selected components in the workspace;
   connecting one or more source magnets and one or more target magnets to achieve a purpose of the model;
   simplifying and converting homoiconic data expression statements into a replacement language;
   processing computations from an executor stack and recording all transactions in a transaction log that follows Atomic, Consistent, Isolated, Durable (ACID) practices;
   applying one or more programming language templates to the replacement language to generate executable code in a modeler-selected programming language;

wherein transaction logs are accessible to at least one modeler in real time while the at least one modeler develops the model; and wherein one or more modelers are allowed to simultaneously interact with elements used to create the model and the transaction log corresponding to the model without interfering with other modelers and without corrupting data.

2. The method of claim 1, wherein the manipulating of the selected components includes at least one of: placing, configuring, connecting, editing, and combining selected predefined or customized components to achieve preferred objectives, wherein the selected components are at least one taken from a set of widgets, connectors, composite widgets, network connections, and internal transport, wherein the internal transport provides connections between widgets regardless of where processing for associated widgets is carried out.

3. The method of claim 2, further comprising externally generated custom code modules written in a compatible programming language, wherein the external custom code modules are provided by the at least one modeler and are capable of being interfaced through a modeled application in addition to or in place of one or more data flow components.

4. The method from claim 1, wherein the homoiconic data expression statements are edited in modeler-selected model components to achieve the modeler's purpose.

5. The method of claim 1, further comprising changes to data that are recorded in the transaction log from actions of processing steps, wherein the changes are documented and persistent, allowing inspection, rollback, and reversal of the changes as by the at least one modeler.

6. The method of claim 1, wherein the homoiconic data expression statements are written in an interface description language for easy readability by modelers without formal programming training.

7. The method of claim 1, wherein the one or more programming language templates are one or more of: Python, JavaScript, Java, C, C++, C #, Go, R, Swift, PHP: Hypertext Preprocessor (PHP), Structured Query Language (SQL), HyperText Markup Language (HTML), Cascading Style Sheets (CSS), TypeScript, Bash/Shell, Visual Basic, LISP, Tcl, Ruby, Rust, Perl, Common Business Oriented Language (Cobol), Fortran, and Pascal programming languages.

8. The method of claim 1, wherein the method further comprises processing actions for portions of data flow expressions are variously distributed among available connected device and subsystem processors to configure an operating environment optimized for at least one from a set of connected device and subsystem attributes including real time performance capability, overall speed of execution, availability of network and bus connection resources, available output devices including display screens and audio output elements, memory availability on platforms of execution, power availability on the platforms of execution, and data concentration points, wherein distribution of associated processing actions for portions of the data flow expressions is manually directed according to modeler preferences.

9. The method of claim 8, wherein the distribution of associated processing actions for the portions of the data flow expressions is directed on an automated basis according to preselected modeler preferences regarding subsystem attributes in consideration of interconnection capabilities and available resources of connected devices and subsystems.

10. A system for developing low-code and no-code software applications in a visual programming environment using homoiconic data flow expressions to define model processing steps, the system comprising:

at least one processor;

a memory coupled to the at least one processor and storing instructions thereon, wherein the instructions, when executed by the at least one processor, perform operations comprising:

invoking a graphical modeling program;

starting or loading a model in a visual workspace, wherein the visual workspace is two-dimensional (2D) or three-dimensional (3D);

manipulating selected components in the workspace;

connecting one or more source magnets and one or more target magnets to achieve a purpose of the model;

simplifying and converting homoiconic data expression statements into a replacement language;

processing computations from an executor stack and recording all transactions in a transaction log that follows Atomic, Consistent, Isolated, Durable (ACID) practices;

applying one or more programming language template to the replacement language to generate executable code in a modeler-selected programming language;

wherein transaction logs are accessible to at least one modeler in real time while the at least one modeler develops the model; and wherein one or more modelers are allowed to simultaneously interact with elements used to create the model and the transaction log corresponding to the model without interfering with other modelers and without corrupting data.

11. The system of claim 10, wherein the manipulating of the selected components includes at least one of: placing, configuring, connecting, editing, and combining selected predefined or customized components to achieve preferred objectives, wherein the selected components are at least one taken from a set of widgets, connectors, composite widgets, network connections, and internal transport, wherein the internal transport provides connections between widgets regardless of where processing for associated widgets is carried out.

12. The system of claim 11, further comprising externally generated custom code modules written in a compatible programming language, wherein the external custom code modules are provided by the at least one modeler and are capable of being interfaced through a modeled application in addition to or in place of one or more data flow components.

13. The system of claim 10, wherein the homoiconic data expression statements are edited in modeler-selected model components to achieve the modeler's purpose.

14. The system of claim 10, further comprising changes to data that are recorded in the transaction log from actions of processing steps, wherein the changes are documented and persistent, allowing inspection, rollback, and reversal of the changes by the at least one modeler.

15. The system of claim 10, wherein the homoiconic data expression statements are written in an interface description language for easy readability by modelers without formal programming training.

16. The system of claim 10, wherein the one or more programming language template are one or more of: Python, JavaScript, Java, C, C++, C #, Go, R, Swift, PHP: Hypertext Preprocessor (PHP), Structured Query Language (SQL), HyperText Markup Language (HTML), Cascading Style Sheets (CSS), TypeScript, Bash/Shell, Visual Basic, LISP, Tcl, Ruby, Rust, Perl, Common Business Oriented Language (Cobol), Fortran, and Pascal programming languages.

17. The system of claim 10, wherein the method further comprises processing actions for portions of data flow expressions are variously distributed among available connected device and subsystem processors to configure an operating environment optimized for at least one from a set of connected device and subsystem attributes including real time performance capability, overall speed of execution, availability of network and bus connection resources, available output devices including display screens and audio output elements, memory availability on platforms of execution, power availability on the platforms of execution, and data concentration points, wherein distribution of associated processing actions for portions of the data flow expressions is manually directed according to modeler preferences.

18. The system of claim 17, wherein the distribution of associated processing actions for the portions of the data flow expressions is directed on an automated basis according to preselected modeler preferences regarding subsystem attributes in consideration of interconnection capabilities and available resources of connected devices and subsystems.

\* \* \* \* \*